E. H. ROONEY.
DRAW BOX.
APPLICATION FILED JULY 28, 1909.
Reissued Nov. 16, 1909. 13,041.
Fig: 1,
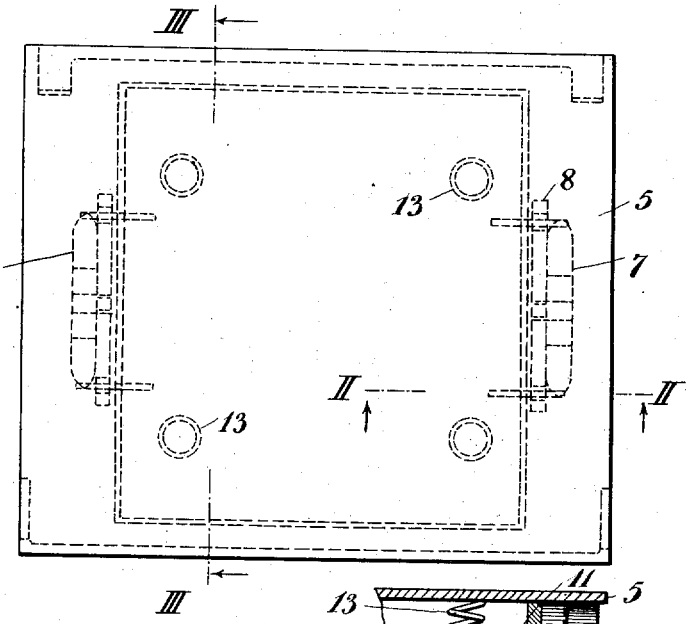
Fig: 2,
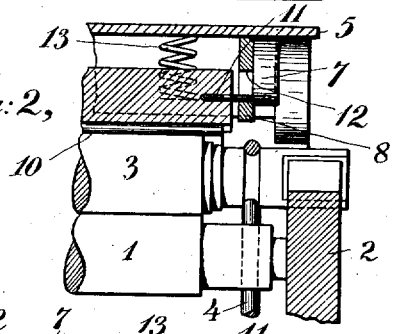
Fig: 3,
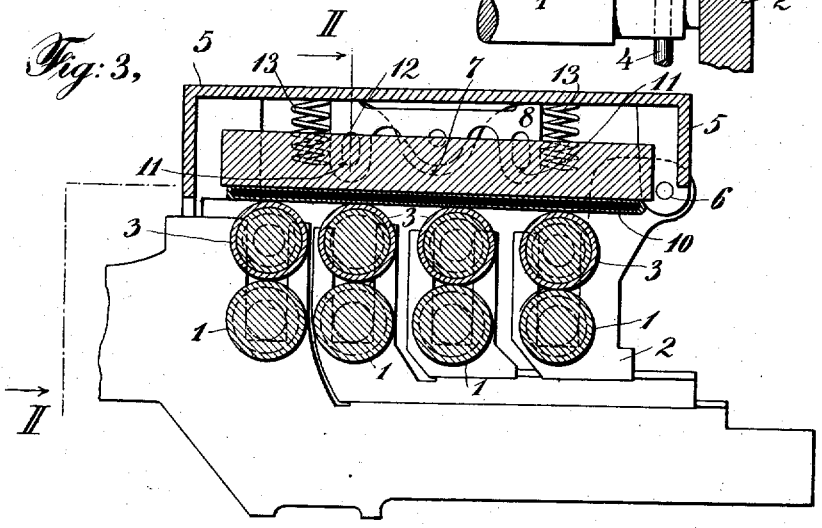
Witnesses:
J. Petri-Pflueger
H. C. Kimball
Elmer H. Rooney Inventor
By his Attorney
McMorrow James
ANDREW S. GRAHAM CO., PHOTO-LITHOGRAPHERS, WASHINGTON, D. C.

UNITED STATES PATENT OFFICE.

ELWIN H. ROONEY, OF WHITINSVILLE, MASSACHUSETTS, ASSIGNOR TO THE WHITIN MACHINE WORKS, OF WHITINSVILLE, MASSACHUSETTS, A CORPORATION OF MASSACHUSETTS.

DRAW-BOX.

13,041. Specification of Reissued Letters Patent. Reissued Nov. 16, 1909.

Original No. 920,655, dated May 4, 1909, Serial No. 387,179. Application for reissue filed July 28, 1909. Serial No. 510,152.

*To all whom it may concern:*

Be it known that I, ELWIN H. ROONEY, a citizen of the United States, residing at Whitinsville, in the county of Worcester, State of Massachusetts, have invented certain new and useful Improvements in Draw-Boxes, of which the following is a full, clear, and concise specification.

My invention relates to draw-boxes, and especially concerns improvements in the means for cleaning or clearing the leather or top drawing-rolls thereof. Such rolls operate under great pressure, as is well known, and their surfaces, when constituted of leather, require special coating and treatment so as to provide a proper surface for engagement with the cotton fibers, and in any case when in use they require to be constantly cleaned and wiped so that the cotton passing beneath them will not stick to them.

My invention aims to clean these top or leather rolls in a better and more effective manner than has hitherto been accomplished, and to this end involves the employment of special pressure means for the clearer of the drawing rolls, as will be more fully described below and more particularly pointed out in the appended claims.

Figure 1 is a top plan view of a draw-box, certain unessential parts being omitted; Fig. 2 is a vertical cross-section of the draw-box on line II—II of Figs. 1 and 3; and Fig. 3 is a vertical section on line III—III of Fig. 1. The draw-head illustrated comprises four sets of lower drawing rolls 1, journaled in blocks 2, and four corresponding top rolls, shown at 3, which are the usual leather-covered top rolls pressed against the lower rolls 1 by means of weighted stirrups, such as shown at 4, hung upon their projecting axles. The draw-box cover 5, of cast-iron, hinges at the point 6 to a fixed part of the apparatus, and on its under side is provided with two depending lugs 7 which form a means of attachment and support for two yokes 8, each of which is pivoted to one of said lugs, as clearly shown in the drawing. The top roll clearer, which is common to the several top rolls, consists of a flat board or slab 9 with its bottom surface covered with felt 10 or similar material suitable for cleaning the leather rolls. This clearer is located between the two yokes 8, and connected thereto by means of lateral pins 11 engaging in the vertical slots 12 in the ends of the yokes, so that it is movable with considerable play upon the cover and is at the same time securely connected to it.

When the cover 5 is closed, as shown in the drawing, the movable clearer is pressed against the top leather rolls by means of a set of four helical springs 13 which are interposed between the cover and the clearer, at the four corners of the latter, each spring being retained in position by means of recesses formed in the top of the clearer, in which recesses the springs are seated. The pressure thus caused to be exerted on the clearer at the several separated points thereon is effective in holding it in firm and substantially uniform contact with each of the four drawing rolls so that the momentary rising of any single roll as it accommodates itself to an increasing thickness in the lap or sliver or a bunch in the same, does not lift the clearer away from the adjacent rolls or materially alter its normal horizontal position. The felt lining is naturally soft or compressible, and under the pressure of the springs the top of each roll sinks more or less into it so that even though one roll should be momentarily elevated, the adjacent rolls will still be maintained in wiping contact with the felt sufficient to keep them clean.

Clearers of draw-boxes as hitherto known to me, have usually been made of comparatively light material and without special pressure means, so that they are incapable of causing the rolls to sink appreciably into the felt, and I have observed in consequence, that certain of the rolls are frequently out of wiping contact with the felt while some other roll is momentarily elevated to accommodate thickened portions of the lap. This interruption of the wiping action, though of very brief duration at each occurrence, aggregates a considerable total in the long run, and I believe to be the chief, if not the sole, cause for the well-known difficulties in keeping the rolls in properly cleaned condition and the draw-box in working order. By increasing the force with which the felt is pressed upon the rolls so that all of them are in contact therewith, notwithstanding their variations in relative height, as above described, this objection is largely eliminated and with ordinary attention the rolls never become so dirty as to cause the clogging or stoppage of the machine.

It will be observed from the foregoing that the pressure on the clearer felt due to the action of the springs should be sufficient to cause the rolls to sink slightly into the felt and to eliminate bouncing of the clearer on the rolls when the latter encounter bunches or inequalities in the lap. It will also be observed that the application of the pressure at diversified points on the top of the clearer facilitates the described action and tends to pevent the tilting of the clearer when the intermediate rolls are relatively higher than the end rolls.

Having described my invention, what I claim and desire to secure by United States Letters Patent, is:

1. In a draw-box, the combination with the top rolls thereof, a clearer common to said rolls provided with a soft felt-like lining in engagement therewith, of means acting at diversified separate points on said clearer for pressing it upon said top rolls.

2. In a draw-box, the combination with the top rolls thereof, a clearer common to said rolls and provided with a felt-like lining in engagement therewith, of a number of springs acting upon said clearer at different points to press it toward the rolls and means for retaining said springs in such position.

3. In a draw-box, a series of top rolls, a clearer common to all of said rolls and provided with a felt-like lining in engagement therewith, said clearer being relatively stationary with respect to said rolls, in combination with a cover to said draw box loosely connected to said clearer and means interposed between said cover and clearer adapted to act on the latter at separate points to press the same firmly upon the rolls.

In testimony whereof, I have signed my name to the specification in the presence of two subscribing witnesses.

ELWIN H. ROONEY.

Witnesses:
CHESTER C. LAMB,
OSCAR L. OWEN.